United States Patent
Dakhiya et al.

(10) Patent No.: US 10,141,956 B2
(45) Date of Patent: Nov. 27, 2018

(54) DEVICE FOR BI-DIRECTIONAL AND MULTI-BAND RF COMMUNICATION OVER SINGLE RESONANT TRANSMISSION LINE AND METHOD OF ITS REALIZATION

(71) Applicant: EAGANTU LTD., Ra'anana (IL)

(72) Inventors: Michael Dakhiya, Tel Aviv (IL); Eran Shaked, Ra'anana (IL)

(73) Assignee: Eagantu, Ltd., Ra'anana (IL)

( * ) Notice: Subject to any disclaimer, the term of this patent is extended or adjusted under 35 U.S.C. 154(b) by 129 days.

(21) Appl. No.: 14/970,652

(22) Filed: Dec. 16, 2015

(65) Prior Publication Data
US 2016/0173138 A1 Jun. 16, 2016

Related U.S. Application Data

(60) Provisional application No. 62/092,284, filed on Dec. 16, 2014.

(51) Int. Cl.
*H04B 1/00* (2006.01)
*H04L 5/14* (2006.01)

(52) U.S. Cl.
CPC ......... *H04B 1/0057* (2013.01); *H04L 5/1461* (2013.01)

(58) Field of Classification Search
CPC ................................. H04B 1/00; H04L 5/00
See application file for complete search history.

(56) References Cited

U.S. PATENT DOCUMENTS

| | | | |
|---|---|---|---|
| 2,887,664 A | 5/1959 | Hogan | |
| 3,183,457 A | 5/1965 | Carter et al. | |
| 5,023,866 A * | 6/1991 | De Muro | H01P 1/2056 333/126 |
| 5,515,015 A | 5/1996 | Nakata | |
| 5,689,817 A | 11/1997 | Fok | |
| 5,864,260 A | 1/1999 | Lee | |
| 6,351,628 B1 | 2/2002 | Leizerovich et al. | |
| 2004/0018819 A1 * | 1/2004 | Coan | H04B 1/52 455/83 |

* cited by examiner

*Primary Examiner* — Andrew Lai
*Assistant Examiner* — Sumitra Ganguly
(74) *Attorney, Agent, or Firm* — M&B IP Analysts, LLC

(57) ABSTRACT

A duplexing system including: a duplexer; an antenna capable of transmitting and receiving electromagnetic signals; a transmitter adapted to couple electromagnetic signals to said antenna for transmission; a receiver capable of receiving electromagnetic signals; wherein the duplexer includes a first transmission line and a second transmission line, wherein a portion of said first transmission line is placed in proximity to a portion of said second transmission line, wherein one end of said first transmission line is connected to a first duplexer port coupled to said antenna and the second end of said first transmission line is connected to a second duplexer port coupled to said transmitter; and wherein one end of said second transmission line is connected to a third duplexer port coupled to said receiver and the second end of said second transmission line is coupled to ground or to a fourth duplexer port coupled to ground.

32 Claims, 15 Drawing Sheets

Magnetic Duplexer

75

DEVICE FOR BI-DIRECTIONAL AND MULTI-BAND RF COMMUNICATION OVER SINGLE RESONANT TRANSMISSION LINE AND METHOD OF ITS REALIZATION

This application claims the benefit of U.S. Provisional Application No. 62/092,284 filed Dec. 16, 2014, the entire content of which is hereby incorporated by reference.

FIELD OF THE INVENTION

The present invention relates to the field of electromagnetics. More particularly, the present invention relates to a duplexing device used in RF communications.

BACKGROUND OF THE INVENTION

In wireless devices such as cellular telephones and other full duplex transceivers, transmitter and receiver circuits are generally active simultaneously while sharing the same antenna. Bi-directional communication over a single transmission line is a standard method used in common wireless devices for navigating RF signals thereon. A standard method of connecting the RF antenna to a transmitter (Tx) and a receiver (Rx) includes connecting the antenna to a duplexer device. The duplexer connects the antenna to the transmitter for outgoing RF signals and the same antenna to the receiver for incoming RF signals. The duplexer prevents the incoming RF signals from reaching the transmitter and prevents the outgoing RF signal from reaching the receiver. Thus, the main goal of such a duplexer is to provide total separation between transmitting and receiving paths to/from a single common antenna and providing high isolation between the paths. FIG. 1A shows an example of a wireless device configuration using a duplexer.

FIG. 1B shows a transceiver block diagram including a duplexer with three connections: to an antenna, to a receiver and to a transmitter.

FIG. 1c shows an example of a physical duplexer device with three connection points—to the antenna, to the receiver and to the transmitter.

There are three major methods of realization for RF duplexers: using semiconductor switches, using RF magnetic devices and using a combination of band-pass filters usually built with SAW technology.

Duplexers with semiconductor switches (FIG. 2A) probably involve the simplest method for RF signal navigation. According to this method, the switch simply breaks the unwanted path allowing RF signals to propagate to the antenna from the transmitter (for outgoing signals) or allowing RF signals to propagate from the antenna to the receiver (for incoming signals). However, this method requires an external source of energy for the switch and a detector for incoming/outgoing direction recognition. Thus, while the breaking part itself is relatively simple, this method requires additional complicated active parts in addition to the energy source. This method is described, for example, in US U.S. Pat. No. 5,689,817 and in U.S. Pat. No. 6,351,628.

Another method for RF signal navigation includes using duplexer devices having magnetic material. This method is based on interaction between the RF signals and magnetic material inserted into the duplexer devices causing a Faraday Effect. Such an interaction causes phase change for the RF signals (FIG. 2B) and as a result, the signal always exits the port adjacent to its input port (FIG. 2C). Connecting the antenna, transmitter and receiver of a wireless device to different ports of such a duplexer may provide a fitting navigation of RF signals in certain applications. However, the magnetic duplexer has significant disadvantages:

a. high energy (insertion) losses due to presence of magnetic material (typically close to 2 dB);
b. it requires having a relatively large size;
c. its structure necessitates high costs.

Such devices are described, for example, in U.S. Pat. No. 3,183,457 and in U.S. Pat. No. 2,887,664.

Another method for RF signal navigation includes using duplexer devices based on band pass filters containing two filters for two frequency bands since incoming and outgoing RF signals usually use different frequencies. Received signals from the antenna that "spill over" to the transmitter path are filtered out (i.e. blocked by the filter), as shown in FIG. 2D. However, even though the transmitted and received signal frequencies are different they are very close with small frequency separation, thus requiring filters with steep rejection. Such rejection can be obtained with SAW technology at the expense of high insertion loss (typically close to 2 dB). Isolation between the paths can also be a problem. Such a design is described, for example, in U.S. Pat. No. 5,864,260 and in U.S. Pat. No. 5,515,015.

Marketplace factors demand long battery life, low cost and high levels of performance. These aforementioned prior art methods still lack efficient means for providing sufficient RF signal navigation that overcome several of the aforementioned shortcomings. It is therefore an object of the present invention to provide an efficient duplexing means and method.

It is further an object of the present invention to provide a method and means to overcome the aforementioned shortcomings.

Other objects and advantages of the present invention will become apparent as the description proceeds.

SUMMARY OF THE INVENTION

The present invention relates to a duplexer navigating signals entering and exiting its ports/terminals. The duplexer comprises a bi-directional line connected between two of its ports enabling signal propagation in two directions. The duplexer further comprises an additional transmission line in proximity to the bi-directional line enabling electromagnetic induction between the lines. It should be understood that the terms electromagnetic induction and electromagnetic coupling are used herein interchangeably. The additional line in proximity to the bi-directional line is structured to enable signal propagation in one direction only. Thus the duplexer is capable of passing an induced signal on the one-directional line propagating in a first direction to an output port of the duplexer, and concurrently capable of suppressing an induced signal on the one-directional line propagating in a the opposite direction.

The duplexer is primarily used in an RF transceiver system, navigating received signals from an antenna and signals to be transmitted from a transmitter (wherein the duplexer may also be used in other applications). The transmitter is connected to the first duplexer port connected to a first end of the bi-directional line, and the antenna is connected to the second duplexer port connected to the other end of the bi-directional line. Thus the signals to be transmitted (from the transmitter via the antenna) and the signals received from the antenna, propagate on the bi-directional line. The received signals from the antenna propagate on the bi-directional line and are induced to the one directional line (in the opposite direction). The duplexer enables propagation of this induced signal and the signal is passed to the receiver. The signal to be transmitted from the transmitter (to the antenna for transmission) also propagates on the bi-directional line and may be induced (depending on frequency) to the one directional line (in the opposite direction). The duplexer comprises means for suppressing propagation of this induced signal (on the one directional line) propagating in the direction from the receiver, and thus the signal propagation is stopped/restricted.

The present invention relates to a duplexing system comprising:

a duplexer;

an antenna capable of transmitting and receiving electromagnetic signals;

a transmitter adapted to couple electromagnetic signals to said antenna for transmission;

a receiver capable of receiving electromagnetic signals;

wherein the duplexer comprises a first transmission line and a second transmission line, wherein a portion of said first transmission line is placed in proximity to a portion of said second transmission line, wherein one end of said first transmission line is connected to a first duplexer port coupled to said antenna and the second end of said first transmission line is connected to a second duplexer port coupled to said transmitter; and wherein one end of said second transmission line is connected to a third duplexer port coupled to said receiver and the second end of said second transmission line is coupled to ground, wherein said second end of said second transmission line is optionally connected to a fourth duplexer port coupled to ground.

Preferably, the portion of the first transmission line placed in proximity to the portion of the second transmission line is such that enables occurrence of electromagnetic induction of RF signals between them.

Preferably, the first transmission line enables signal propagation in both directions and the second transmission line enables signal propagation in one direction, wherein said one direction is the direction to the third duplexer port.

Preferably, the portion of the first transmission line is substantially parallel to the portion of said second transmission line.

Preferably, the second transmission line comprises a signal direction power detector responsive to the signal propagation direction of the signal propagating in said second transmission line, such that said signal direction power detector enables signal propagation in the direction to the third duplexer port and restricts signal propagation in the direction from the third duplexer port.

Preferably, the signal direction power detector comprises a switch, wherein when signal propagation on the second transmission line is in the direction from the third duplexer port, the switch is turned to an "off" mode cutting off the signal flow on said second transmission line, and wherein when signal propagation on the second line is in the direction to the third duplexer port, the switch is turned to an "on" mode enabling signal flow on said second transmission line.

Preferably, the second transmission line comprises a reflecting load such that said reflecting load enables signal propagation in the direction to the third duplexer port and restricts signal propagation in the direction from the third duplexer port.

Preferably, the second transmission line comprises a filter.

Preferably, the duplexer further comprises a plurality of additional transmission lines coupled to loads at each end, or optionally opened at one end, wherein a portion of each of said additional transmission lines is spaced apart from one another substantially on the same plane such that each two adjacent spaced apart portions are substantially parallel and in proximity to one another, and wherein one of the spaced apart portions being the edged spaced apart portion and in proximity to a portion of the second transmission line.

Preferably, the portions of each of said additional transmission lines being spaced apart from one another is such that enables occurrence of electromagnetic induction of RF signals between them; and the edged spaced apart portion in proximity to the portion of the second transmission line is such that is such that enables occurrence of electromagnetic induction of RF signals between them.

Preferably, the electromagnetic induction occurring on the additional transmission lines cause a reduction or restriction of signal propagation in the direction from the third duplexer port.

Preferably, the duplexer further comprises a plurality of additional transmission lines coupled to loads at each end, or optionally opened at one end, wherein a portion of each of said additional transmission lines is substantially parallel and in proximity to a portion of the second transmission line.

Preferably, the portions of each of the additional transmission lines being substantially parallel and in proximity to a portion of the second transmission line is such that enables occurrence of electromagnetic induction of RF signals between at least two of said additional transmission lines, and/or enables occurrence of electromagnetic induction of RF signals between at least one of said portions and the second transmission line; wherein said electromagnetic induction causes a reduction or restriction of signal propagation in the direction from the third duplexer port.

The present invention relates to a duplexing system comprising:

a duplexer;

an antenna capable of transmitting and receiving electromagnetic signals;

a transmitter adapted to couple electromagnetic signals to said antenna for transmission;

a receiver capable of receiving electromagnetic signals;

wherein the duplexer comprises a first transmission line and a second transmission line, wherein a portion of said first transmission line is placed in proximity to a portion of said second transmission line, wherein one end of said first transmission line is connected to a first duplexer port coupled to said antenna and the second end of said first transmission line is connected to a second duplexer port coupled to said transmitter; and wherein both ends of said second transmission line are connected to loads;

wherein said second transmission line comprises a high directivity coupler (directional coupler) comprising an interior transmission line connected at one end to a third duplexer port coupled to the receiver and at the other end to the ground;

wherein a portion of said interior transmission line is in proximity to a portion of said second transmission line.

The present invention relates to a method for navigating signals entering and exiting from a duplexer as explained herein. Preferably, the method is for transmitting and receiving electromagnetic signals, wherein the receiving is achieved by:

A) passing a received electromagnetic signal from an antenna to a duplexer;

B) passing the received signal within said duplexer via a first transmission line;

C) electromagnetically coupling the received signal on the first transmission line to a second transmission line;

D) passing the received signal on the second transmission line to a receiver;

and wherein the transmitting is achieved by:

A) passing the signal to be transmitted from a transmitter to said duplexer;

B) passing the signal to be transmitted within said duplexer via said first transmission line;

C) provided that the signal to be transmitted is electromagnetically coupled from said first transmission line to said second transmission line, restricting propagation of the coupled signal on the second transmission line;

D) passing the signal to be transmitted on said first transmission line to the antenna for transmission.

Preferably, restricting propagation of the coupled signal in step C of the transmitting is executed according to one of the following manners:

A) cutting off the signal flow on the second transmission line by means of a switch of a signal direction power detector responsive to the signal propagation direction of the signal propagating in said second transmission line;

B) providing the second transmission line comprises a reflecting load, suppressing the coupled signal by a reflecting signal caused by said reflecting load such that the coupled signal and the reflecting signal substantially cancel each other;

C) providing the second transmission line comprises a filter, suppressing the coupled signal by means of a filter;

D) suppressing the coupled signal by coupling the coupled signal to one or more additional transmission lines;

E) providing a plurality of additional transmission lines, suppressing the coupled signal by coupling the coupled signal to a first of said additional transmission lines and optionally repeating the step of coupling the signal from an additional transmission line to a subsequent additional transmission line, wherein in said optionally repeated step the signal is coupled to an additional transmission line which has not been previously used.

The present invention relates to a method for transmitting and receiving electromagnetic signals, wherein the receiving is achieved by:

A) passing a received electromagnetic signal from an antenna to a duplexer;

B) passing the received signal within said duplexer via a first transmission line;

C) electromagnetically coupling the received signal on the first transmission line to a second transmission line;

D) providing the second transmission line comprises a high directivity coupler, electromagnetically coupling the coupled signal on the second transmission line to a third transmission line comprised in said high directivity coupler;

E) passing the received signal on said third transmission line to a receiver;

And wherein the transmitting is achieved by:

A) passing the signal to be transmitted from a transmitter to said duplexer;

B) passing the signal to be transmitted within said duplexer via said first transmission line;

C) passing the signal to be transmitted on said first transmission line to the antenna for transmission.

The present invention relates to a duplexer comprising a first transmission line and a second transmission line, wherein a portion of said first transmission line is placed in proximity to a portion of said second transmission line, wherein one end of said first transmission line is connected to a first duplexer port and the second end of said first transmission line is connected to a second duplexer port; and wherein one end of said second transmission line is connected to a third duplexer port, and the second end of said second transmission line is coupled to ground or connected to a fourth duplexer port.

Preferably, the portion of the first transmission line placed in proximity to the portion of the second transmission line is such that enables occurrence of electromagnetic induction of RF signals between them.

Preferably, the portion of the first transmission line is substantially parallel to the portion of said second transmission line.

Preferably, the second transmission line comprises a signal direction power detector responsive to the signal propagation direction of the signal propagating in said second transmission line, such that said signal direction power detector enables signal propagation in the direction to the third duplexer port and restricts signal propagation in the direction from the third duplexer port.

Preferably, the signal direction power detector comprises a switch, wherein when signal propagation on the second transmission line is in the direction from the third duplexer port, the switch is turned to an "off" mode cutting off the signal flow on said second transmission line, and wherein when signal propagation on the second line is in the direction to the third duplexer port, the switch is turned to an "on" mode enabling signal flow on said second transmission line.

Preferably, the second transmission line comprises a reflecting load such that said reflecting load enables signal propagation in the direction to the third duplexer port and restricts signal propagation in the direction from the third duplexer port.

Preferably, the second transmission line comprises a filter.

Preferably, the duplexer further comprises a plurality of additional transmission lines coupled to loads at each end, or optionally opened at one end, wherein a portion of each of said additional transmission lines is spaced apart from one another substantially on the same plane such that each two adjacent spaced apart portions are substantially parallel and in proximity to one another, and wherein one of the spaced apart portions being the edged spaced apart portion is in proximity to a portion of the second transmission line.

Preferably, the portions of each of said additional transmission lines being spaced apart from one another is such that enables occurrence of electromagnetic induction of RF signals between them; and the edged spaced apart portion in proximity to the portion of the second transmission line is such that is such that enables occurrence of electromagnetic induction of RF signals between them.

Preferably, the electromagnetic induction occurring on the additional transmission lines cause a reduction or restriction of signal propagation in the direction from the third duplexer port.

Preferably, the duplexer further comprises a plurality of additional transmission lines coupled to loads at each end, or optionally opened at one end, wherein a portion of each of said additional transmission lines is substantially parallel and in proximity to a portion of the second transmission line.

Preferably, the portions of each of the additional transmission lines being substantially parallel and in proximity to a portion of the second transmission line is such that enables occurrence of electromagnetic induction of RF signals between at least two of said additional transmission lines, and/or enables occurrence of electromagnetic induction of RF signals between at least one of said portions and the second transmission line; wherein said electromagnetic induction causes a reduction or restriction of signal propagation in the direction from the third duplexer port.

The present invention relates to a duplexer comprising: a first transmission line and a second transmission line, wherein a portion of said first transmission line is placed in proximity to a portion of said second transmission line, wherein one end of said first transmission line is connected to a first duplexer port and the second end of said first transmission line is connected to a second duplexer port; and wherein both ends of said second transmission line are connected to loads;
wherein said second transmission line comprises a high directivity coupler comprising an interior transmission line connected at one end to a third duplexer port and at the other end to the ground;
wherein a portion of said interior transmission line is in proximity to a portion of said second transmission line.

The present invention relates to a method for passing electromagnetic signals through a duplexer, wherein passing from a first source is achieved by:
  A) passing an electromagnetic signal from said first source to a first duplexer port;
  B) passing the signal from said first port within said duplexer via a first transmission line;
  C) electromagnetically coupling the received signal on the first transmission line to a second transmission line;
  D) passing the signal on the second transmission line to a third duplexer port and therefrom to a second source;
and wherein passing from a third source is achieved by:
  A) passing a signal from said third source to a second duplexer port;
  B) passing the signal from said second duplexer port within said duplexer via said first transmission line;
  C) provided that the signal on said first transmission line is electromagnetically coupled from said first transmission line to said second transmission line, restricting propagation of the coupled signal on the second transmission line;
  D) passing the signal from said first transmission line to said first duplexer port and therefrom to said first source.

Preferably, restricting propagation of the coupled signal in step C of the passing from a first source, is executed according to one of the following manners:
  A) cutting off the signal flow on the second transmission line by means of a switch of a signal direction power detector responsive to the signal propagation direction of the signal propagating in said second transmission line;
  B) providing the second transmission line comprises a reflecting load, suppressing the coupled signal by a reflecting signal caused by said reflecting load such that the coupled signal and the reflecting signal substantially cancel each other;
  C) providing the second transmission line comprises a filter, suppressing the coupled signal by means of a filter;
  D) suppressing the coupled signal by coupling the coupled signal to one or more additional transmission lines;
  E) providing a plurality of additional transmission lines, suppressing the coupled signal by coupling the coupled signal to a first of said additional transmission lines and optionally repeating the step of coupling the signal from an additional transmission line to a subsequent additional transmission line, wherein in said optionally repeated step the signal is coupled to an additional transmission line which has not been previously used.

BRIEF DESCRIPTION OF THE DRAWINGS

The present invention is illustrated by way of example in the accompanying drawings, in which similar references consistently indicate similar elements and in which.

DETAILED DESCRIPTION OF THE INVENTION

The present invention relates to a duplexing system for navigation of RF signals in a transceiver system. The present invention system comprises an antenna system comprising an antenna capable of transmitting and receiving RF signals. The system further comprises a signal transmitter coupled to the antenna system, adapted to couple RF signals to the antenna system for transmission. The system further comprises a receiver adapted to receive and be responsive to RF signals derived from the signals received by the antenna system (more particularly to receive RF signals induced from signals received by the antenna system, as will be explained herein).

Embodiments of the present invention provide a duplexing and multi-band communication device and method based on electromagnetic induction between two or more adjacent transmission lines, optionally with additional resonant elements. Electromagnetic coupling is the transfer of electrical energy from one circuit segment to another. In the present invention, the electromagnetic coupling is implemented by energy transfer from one transmission line to another.

The present invention relates to two transmission lines placed substantially parallel and in proximity to each other. Once an electromagnetic wave propagates in the first transmission line, it develops an electromagnetic field around the line. The two lines are substantially parallel and in proximity to each other and thus an electromagnetic field from the first line enters into the second line, and induces an electromagnetic wave propagating in this second line. Directions of the waves propagations in the first and second lines are always opposite.

Figure 1A:
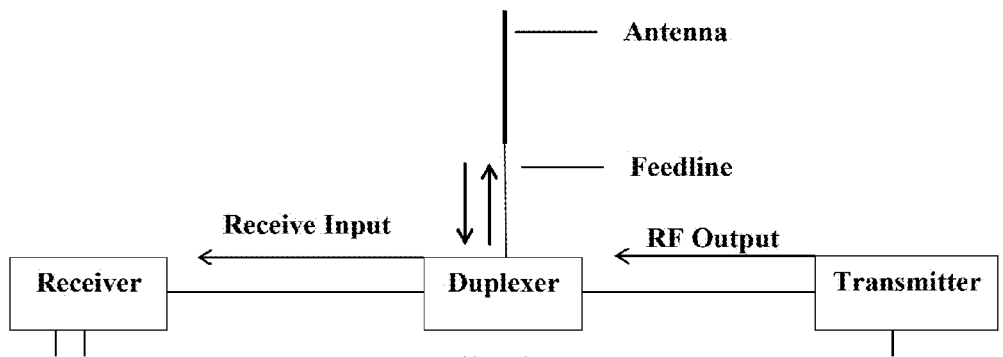
FIGS. 1A-1C illustrate prior art systems/devices.
Figure 1B:
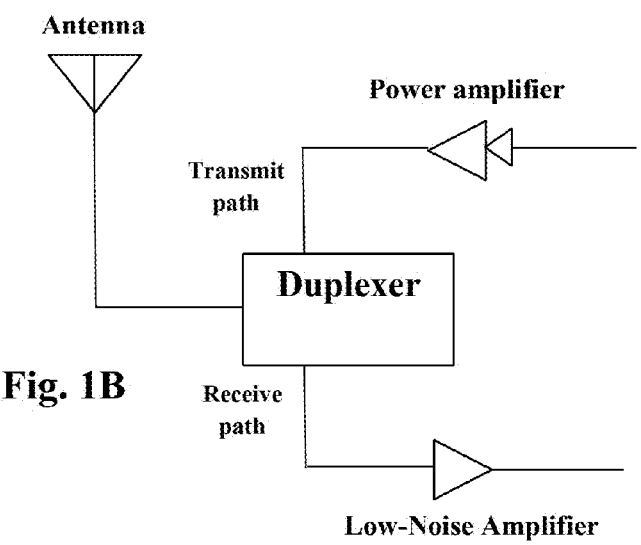
Figure 1C:
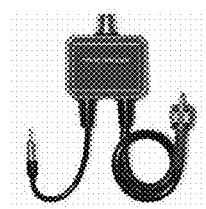
Figure 2A:
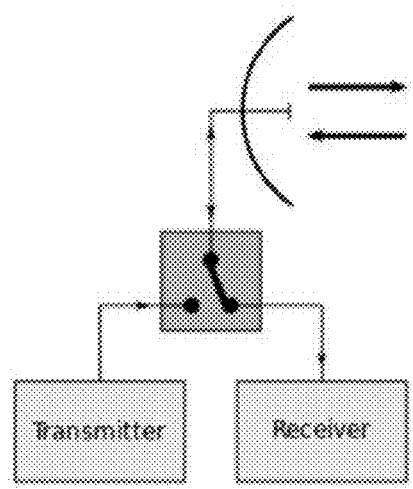
FIGS. 2A-2D illustrate prior art systems/devices.
Figure 2B:
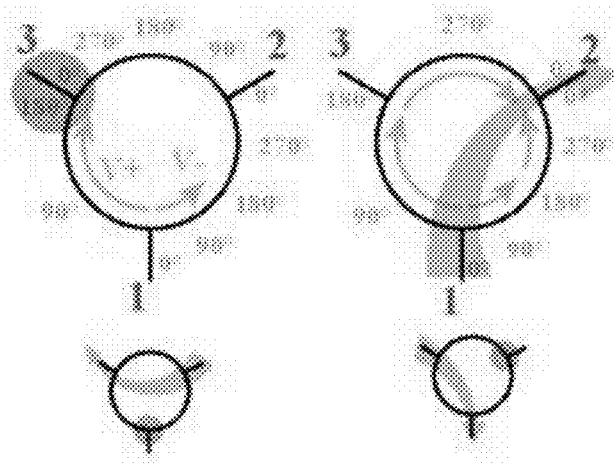
Figure 2C:
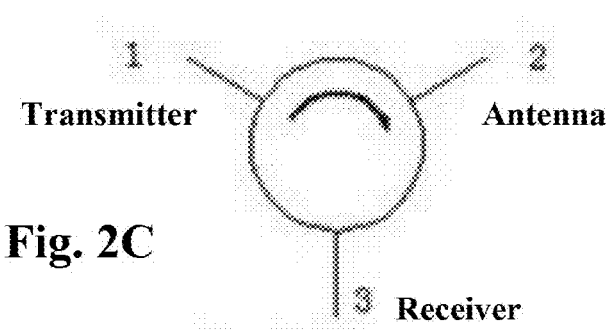
Figure 2D:
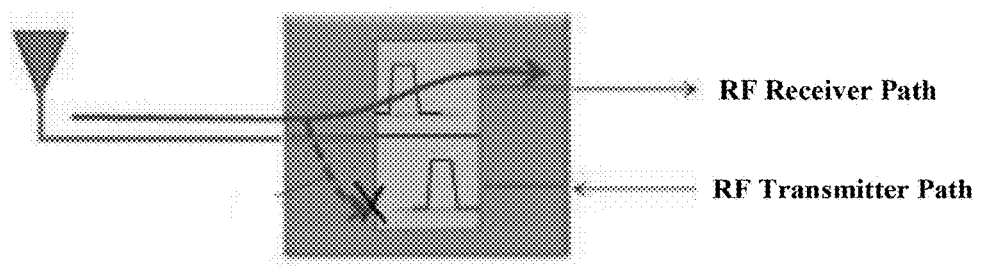
Figure 3A:
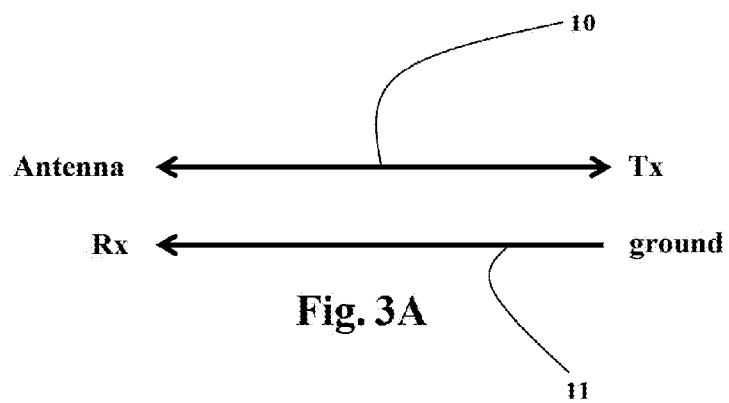
FIGS. 3A-3C illustrate embodiments of the present invention.

The present invention relates to a duplexer 5 comprising two transmission lines having portions substantially parallel placed close enough to one another to ensure occurrence of electromagnetic induction for RF signals between them (FIG. 3A). The first line 10 is bi-directional and can transmit RF signals in both directions, while the second line 11 is one-directional and can transmit RF signals in one direction only. The transformation coefficient or coupling factor between the lines, in the working frequency band (e.g. with a typical bandwidth of 200 MHz) is very high. The Coupling factor for specific frequency bands is dependent on lines geometry and their proximity. The lines geometry and proximity is such that enables a high coupling factor such that almost all the energy from the first line 10 will be induced to the second line 11.

Figure 3B:
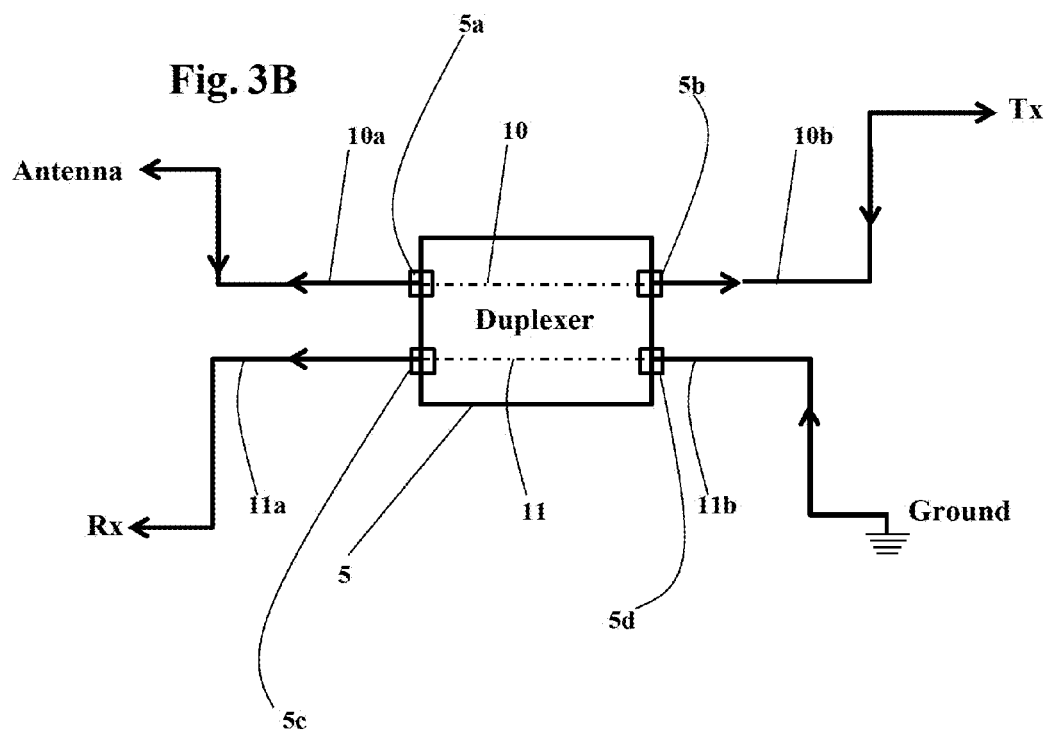
Figure 3C:
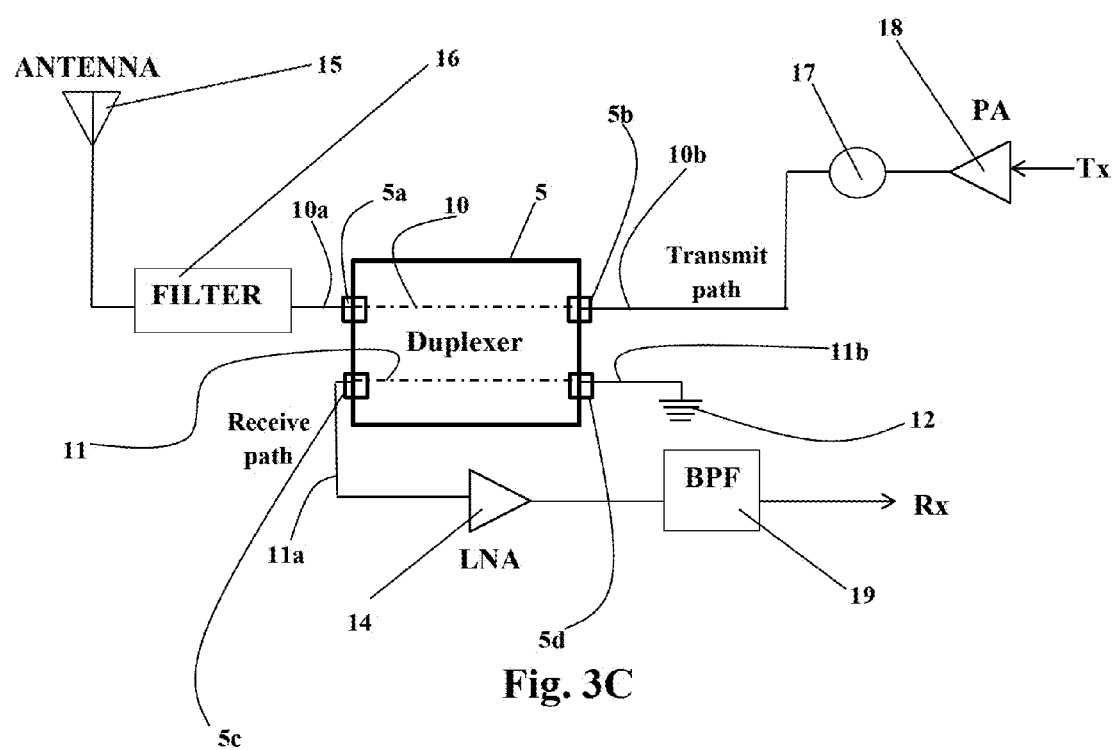

The duplexer 5 first transmission line 10 (bi-directional) is connected at one end to a first duplexer port 5a coupled to an antenna via transmission line 10a. Transmission line 10 is connected at its other end to a second duplexer port 5b coupled to transmitter (Tr) via transmission line 10b. The second transmission line 11 (one directional) is connected at one end to a third duplexer port 5c coupled to the receiver (Rx) via transmission line 11a. The second transmission line 11 is connected at its other end to a fourth duplexer port 5d coupled to the ground via transmission line 11b (optionally transmission line 11 is connected at its other end directly to ground). Such a design allows coupling of an RF signal. The incoming signal (from the antenna) is induced (due to the electromagnetic induction between the transmission lines 10 and 11) and the induced signal is navigated to the receiver (Rx). The structure is such that the direction on line 10 from the antenna to the transmitter (Tx) is opposite to the direction on line 11 to the receiver. Due to high coupling, almost all energy from the antenna is induced from the first line 10 to the second line 11 and reaches the receiver. The outgoing signal (from the transmitter) on the first line 10 is navigated to the antenna and is not induced to the second (one directional) line 11 due to its restriction of signal propagation in that direction (detailed hereinbelow). A block diagram comprising the duplexer 5 comprising four ports on the duplexer that lead to the antenna, transmitter (Tr), receiver (Rx) and ground, are shown in FIG. 3B. Portions of the lines 10 and 11 are substantially parallel and at proximity to one another within the duplexer 5 thus enabling the coupling induction between the lines.

According to one embodiment, the present invention system line 10a further comprises a filter 16 connected between (and coupled to) the antenna 15 and the first duplexer port 5a. The present invention system line 10b further comprises an isolator 17 (a special component for losses improvement in Tx path) and a power amplifier 18 (for transmit signal amplification), both connected in series between the transmitter Tx and the second duplexer port 5b. The present invention system line 11a further comprises a low noise amplifier 14 (for incoming signal amplification) and a band pass filter 19 (for incoming signal filtration), both connected in series between the receiver Rx and the third duplexer port 5c. Line 11b is connected between ground 12 and fourth duplexer port 5d.

Figure 3D:
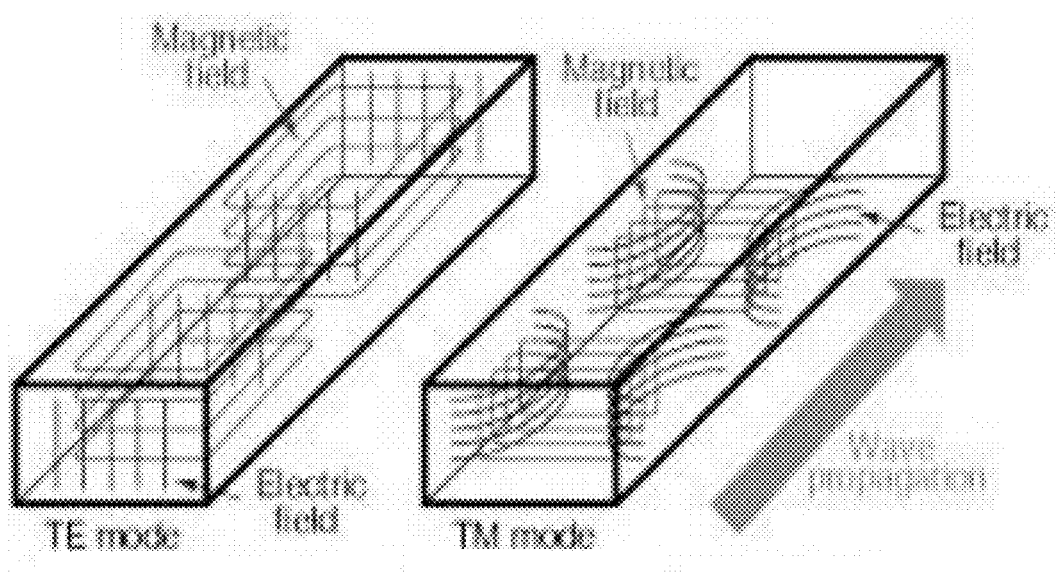
FIG. 3D illustrates the electric and magnetic fields within transmission lines.

According to the laws of electromagnetics, the induced signal on the second parallel transmission line 11 propagates in a direction opposite to that of the original first line 10 signal direction. This is due to the electric and magnetic fields effect. FIG. 3D shows the electric and magnetic fields within transmission lines. In the present invention, both TE (transverse electric) and TM (transverse magnetic) modes propagate in one direction only in the one-directional line.

A substantial advantage of the present invention is the low insertion loss due to the fact that neither energy consuming SAW filters nor magnetic devices are used and the RF signals propagate through low-resistance transmission lines. The present invention may also function in a manner of transmitting and receiving signals of the same frequency.

The present invention is also suitable for multi-frequency or multi-band communication when outgoing signals (from transmitter to antenna) consist of two or more bands. This requires lines geometry and proximity designed and adjusted for these multiple bands. Such an adjustment is usually possible for example, for bands separated by about 1 GHz or less.

The transmission lines realization are as follows. According to one embodiment of the present invention the bi-directional line 10 is built as a simple micro strip transmission line. The realization of the one-directional line 11 is realized according to several embodiments. A few non-limiting embodiments are described as follows.

First Embodiment—Power Detector with Switch

According to this embodiment, the duplexing system one directional transmission line 11 comprises a signal direction power detector 21 responsive to the signal propagation direction of the (induced) signal propagating in line 11, such that it enables signal propagation in the direction to the third duplexer port 5c (and thereafter to the receiver) and restricts signal propagation in the direction from the third duplexer port 5c.

Figure 4:
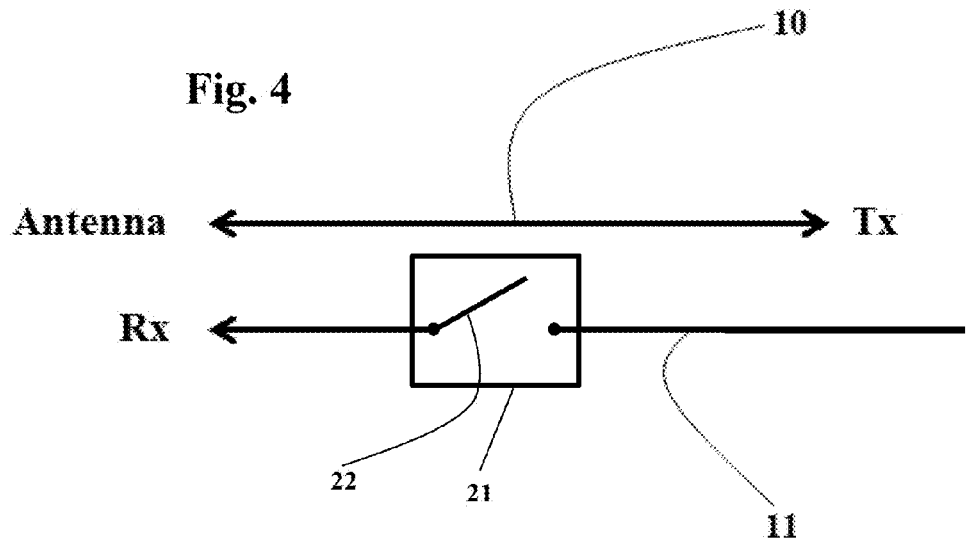
FIG. 4 illustrates a power detector embodiment of the present invention.

FIG. 4 shows the one-directional line 11 comprising a signal direction power detector 21 with a switch 22. The power detector 21 connection is such that it is coupled at one of its ports to third duplexer port 5c and is coupled at another port to fourth duplexer port 5d (not shown for simplicity). The power detector 21 recognizes signal direction and turns the switch 22 on or off accordingly such that it enables signal propagation in one direction only (to the receiver). If the detector 21 detects signal propagation in a direction from the receiver the switch will be turned to an "off" mode cutting off the line 11 and disabling signal flow. If the detector 21 detects signal propagation in a direction to the receiver Rx the switch will be turned to an "on" mode allowing signal propagation on line 11 to the receiver Rx. An example of a commercially available RF signal detector is Avago VMMK-3113-BLKG.

Compared to standard duplexing with switches, according to this embodiment and assuming that signal transmitting and receiving take equal portions of time, the switch will work only half the time, and less energy will be required for its operation.

Following embodiments relate to One-directional lines realized as a part of a passive device. Common for the passive devices is that the line contains special resonant elements converting it to a resonant structure.

Second Embodiment—High Directivity Coupler

According to this embodiment, the duplexer 55 comprises transmission line 10 connected at one end to a first duplexer port 5a coupled to the antenna via transmission line 10a, and at its other end to a second duplexer port 5b coupled to transmitter (Tx) via transmission line 10b (as explained hereinabove). The duplexer 55 comprises an additional transmission line 111 such that a portion of the additional transmission line 111 is substantially parallel and in proximity to transmission line 10. Line 111 is coupled to different loads—36 and 37 at its edges (loads optionally being ground). This enables an induced signal to be coupled from line 10 to the additional line 111. The loads are such that enable appropriate induction and signal propagation thereafter.

Figure 5:
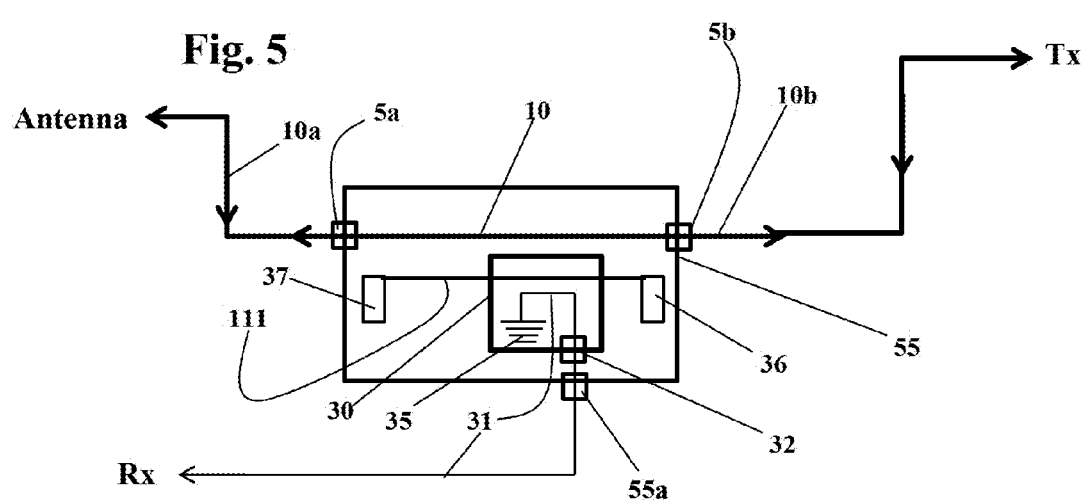
FIG. 5 illustrates a high directivity coupler embodiment of the present invention.

Transmission line 111 comprises a high directivity coupler 30, such that line 111 is inserted through an input and an output of the high directivity coupler 30, as shown in FIG. 5. The high directivity coupler 30 comprises an interior transmission line 31 coupled at one end to the receiver and at the other end to the ground 35. A portion of line 31 is substantially parallel and in proximity to a portion of line 111, such that the induced signal from line 111 is coupled to the interior transmission line 31. When the original signal on line 10 propagates from the antenna to the transmitter (Tx) it is coupled (induced) to line 111 in the opposite direction. The induced signal is coupled (induced) to a parallel portion of line 31 in the high directivity coupler 30, now moving in the opposite direction (to the signal propagating on line 111) on line 31. The signal then propagates via line 31 to the receiver (Rx) (via high directivity coupler output port 32 coupled to duplexer output port 55a coupled to the receiver (Rx)).

When the original signal propagates from the antenna towards the transmitter (Tx) the signal is coupled and induced to line 111 in the opposite direction (leftwards in FIG. 5). Then, the signal on line 111 is coupled and induced to line 31 in the opposite direction (rightwards in FIG. 5). Then the signal exits port 32 and propagates to output port 55a and propagates to the receiver (Rx). The frequency of the signal from the transmitter is usually different. When the original signal propagates from the transmitter (Tx) towards the antenna the signal is coupled and induced to line 111 in the opposite direction (rightwards in FIG. 5). Then, the signal on line 111 is coupled and induced to line 31 in the opposite direction (leftwards in FIG. 5). Since the frequency of the signal from the transmitter is usually different, this embodiment is preferably structured and designed such that the signal from the transmitter is not substantially coupled to line 111 and the induced signal on line 111 is not substantially coupled (if at all) to line 31 (e.g. the dimensions, materials of the lines and distances between them are such that enable electromagnetic induction between the lines at a certain frequency band and prevent electromagnetic induction at a different frequency band).

In this manner signals propagating from the antenna on line reaches the receiver and signals propagating from the transmitter (Tx) to the antenna do not reach the receiver (Rx). According to a preferred embodiment the directivity coupler has a directivity of above 20 dB.

In general the induction in the present invention occurs since geometry and proximity of coupling lines are designed for a maximal coupling factor at specific required frequency bands.

Third Embodiment—Reflecting Load

Figure 6A:
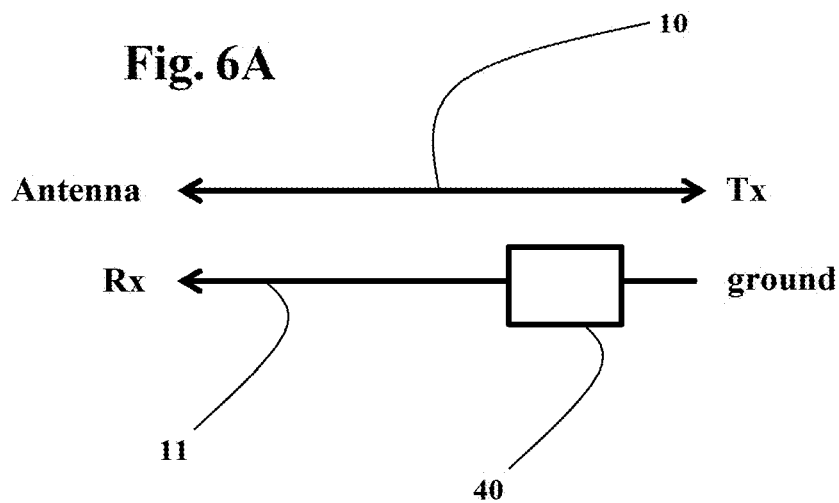
FIGS. 6A-6B illustrate a reflecting load embodiment of the present invention.

According to this embodiment, the one directional transmission line 11 comprises a reflecting load 40, as shown in FIG. 6A. The reflecting load 40 connection is such that it is coupled at one of its ends to third duplexer port 5c and is coupled at another end to fourth duplexer port 5d (not shown for simplicity). The connection is in a manner such that if the induced signal on line 11 propagates towards the receiver (Rx) then the reflecting load 40 does not interfere. If the induced signal on line 11 propagates from the receiver (Rx) then the reflecting load sends a reflecting similar signal back towards the receiver (Rx). The reflected signal suppresses the induced signal due to their phase difference. Thus both signals, from and to the receiver (Rx), cancel each other. Thus the duplexer enables propagation of signals to the receiver (Rx) only via line 11, and restricts propagation of the induced signal in the direction from the receiver (Rx).

Figure 6B:
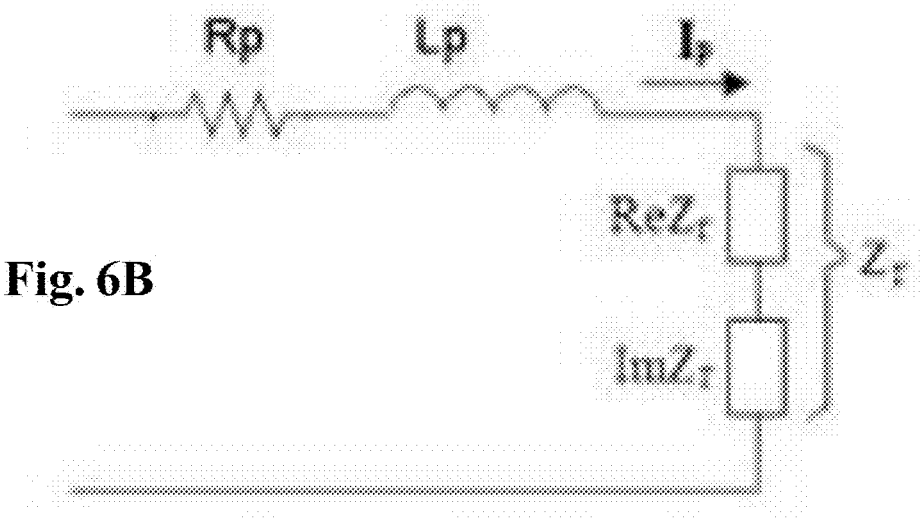

FIG. 6B shows an example of a reflecting load. According to a preferred embodiment a load with impedance Zr is significantly different from the primary impedance of 50 Ohm (wherein Zr<30 Ohm or Zr>70 Ohm). Thus when a signal propagating in line with a standard 50 Ohm impedance reaches the load with a significantly different impedance, the signal is reflected back, according to the laws of electromagnetics.

Fourth Embodiment—Filter

Figure 7A:
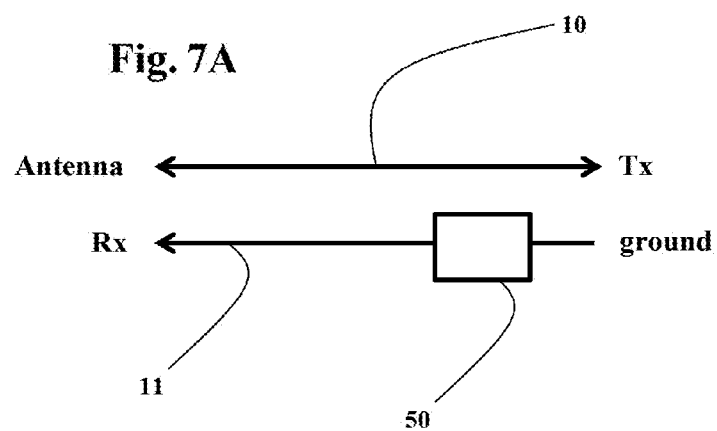
FIGS. 7A-7B illustrate a filter embodiment of the present invention.

This embodiment includes adding resonant filtering components to the one-directional line 11. According to this embodiment, since the signal from the antenna to the receiver (Rx) and the signal from transmitter (Tx) to the antenna have different frequencies, a filter 50 is connected to the second line 11, shown in FIG. 7A.

Figure 7B:
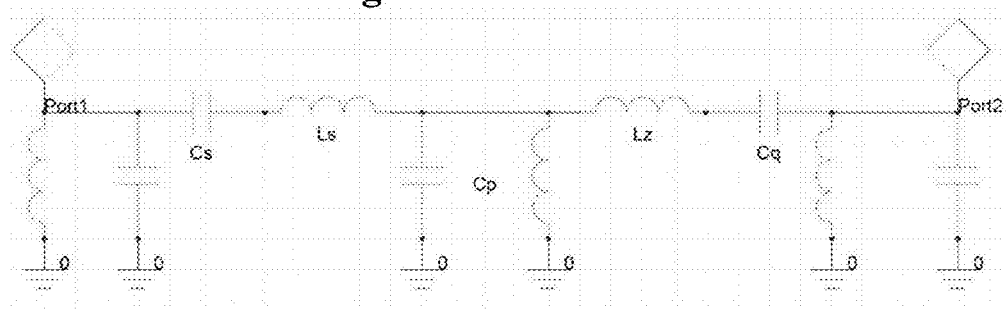

The one directional line 11 comprises the filter 50. The filter 50 connection is such that it is coupled at one of its ends to third duplexer port 5c and is coupled at another end to fourth duplexer port 5d (not shown for simplicity). The filter 50 is such that it restricts propagation of the induced signal on line 11 propagating from the receiver, while enabling propagation of the signal to the receiver (Rx). When the original signal (a transmitted signal) propagates from the transmitter (Tx) to the antenna on line 10, the signal is coupled and induced to line 11 in the opposite direction. The filter 50 restricts its propagation. When the original signal (a received signal) propagates from the antenna to the transmitter (Tx) on line 10 the signal is coupled and induced to line 11 in the opposite direction. The filter 50 is such that it does not interfere with its propagation towards the receiver (Rx). FIG. 7B shows an example of a basic resonant filter design. The filter 50 can be a discrete filter comprising resistors, capacitors and coils and is built such that the filter 50 enables propagation of the induced signal at a certain frequency in one direction (propagating to the receiver) and does not enable propagation of an induced signal at a different frequency in the opposite direction (propagating from the receiver). Since the signal from the antenna to the receiver usually has a different frequency than that of the signal from the transmitter to antenna, this embodiment can be very efficient. The filter is constructed such that it restricts signals induced from signals from the transmitter (having certain frequencies).

Realization of High Coupling Between the Lines

High coupling between the parallel portions of the transmission lines is obtained by close proximity of the parallel portions. Examples of such lines are shown in FIGS. 8A-8C.

Figure 8A:
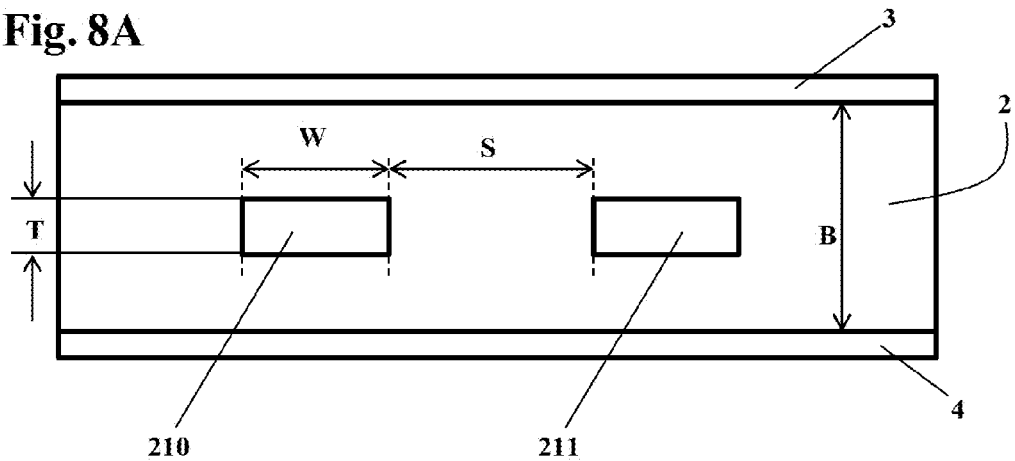
FIGS. 8A-8C illustrate example of line structures according to embodiments of the present invention.

FIG. 8A shows a cross section of two parallel micro strip lines 210 and 211 placed between two ground planes 3 and 4. The ground planes 3 and 4 are layers of conductors (e.g. metal layers) connected to the ground. The distance (B) between the ground planes 3 and 4 is preferably between 20 and 90 microns. Both lines 210 and 211 have a width (W) of preferably 10-45 microns. The Thickness (T) of the lines 210 and 211 is preferably between 10-30 microns. The length of lines 210 and 211 is preferably between 2-3 mm. The separation distance (S) between the parallel lines is preferably between 12-20 microns. The space between the plates is filled with dielectric material 2, preferably with permittivity in the range of 3-70. An example of such dielectric material is ceramics, laminates, etc. Such a design can provide a coupling factor of about 0.2-0.5 dB.

Figure 8B:
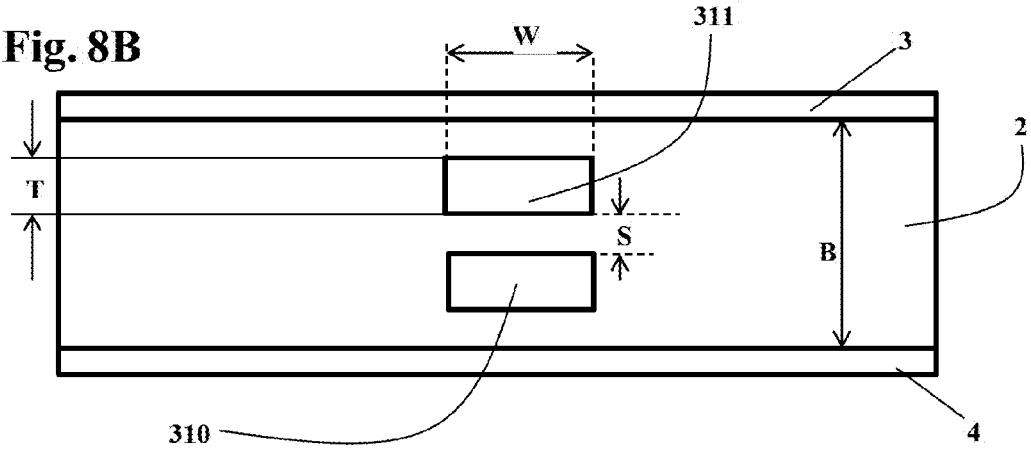

FIG. 8B shows a cross section of two parallel micro strip lines 310 and 311 placed one over the other, placed between two ground planes 3 and 4 (as explained hereinabove regarding FIG. 8A). Both lines 310 and 311 have a width (W) of preferably 12-80 microns. The Thickness (T) of the lines 310 and 311 is preferably between 10-20 microns. The length of lines 310 and 311 is preferably between 2-3 mm. The separation distance (S) between the parallel lines is preferably between 12-20 microns. Such a design can provide coupling factor of about 0.2-0.5 dB.

Figure 8C:
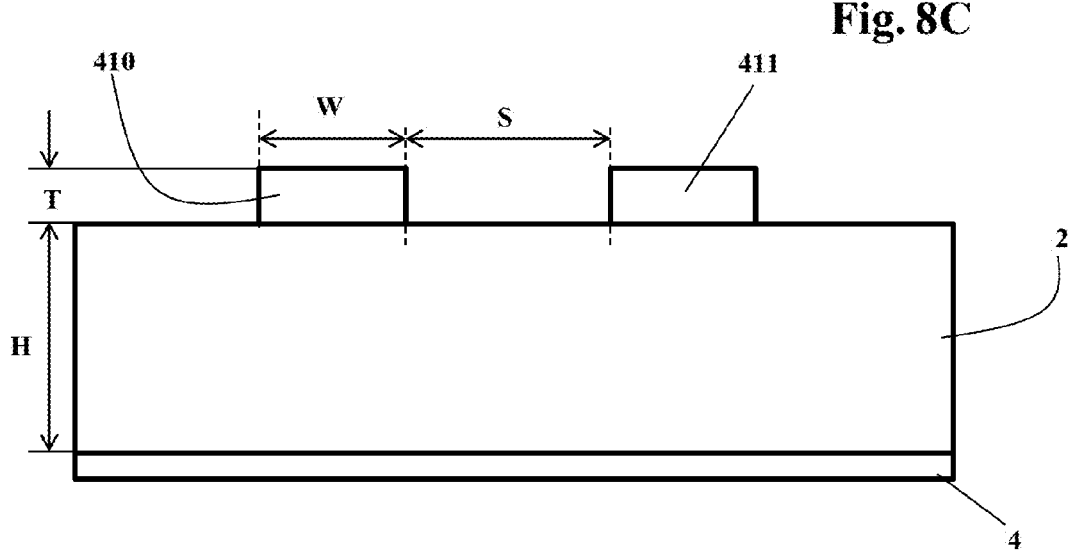

FIG. 8C shows a cross section of two parallel micro strip lines 410 and 411 placed on top of dielectric material 2. The dielectric material 2 is placed on one ground plane 4 (ground plane 4 as explained hereinabove). The height (H) of the dielectric material 2 is preferably between 25-45 microns. The separation distance (S) between the parallel lines is preferably between 12-18 microns. The properties of the width, thickness, length of the lines 410 and 411, and dielectric material are as explained hereinabove regarding FIGS. 8A-8B.

The transmission lines are made of a material selected from the group consisting of copper, gold, silver, or any other material with a high electric conductivity, as known in the art. According to a preferred embodiment, the lines comprise copper or other materials with a dielectric constant of 3-9.

Figure 9A:
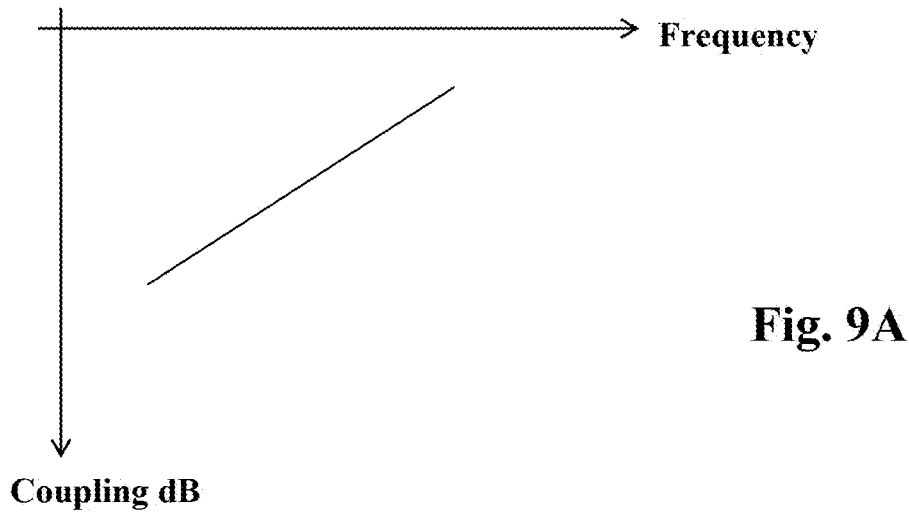
FIGS. 9A-9B illustrate graphs of frequency/coupling.

According to a preferred embodiment of the present invention, the dimensions (e.g. thickness, width, etc.) of the transmission lines are calculated and constructed for specific signal frequencies. The two adjacent parallel transmission lines effectively form a transformer, providing electromagnetic induction between the lines. Transformation coefficient or coupling depends on frequency and are maximized for the working band. Typical dependence of coupling on frequency (typical curve for coupling in wide frequency range) is shown in FIG. 9A.

Figure 9B:
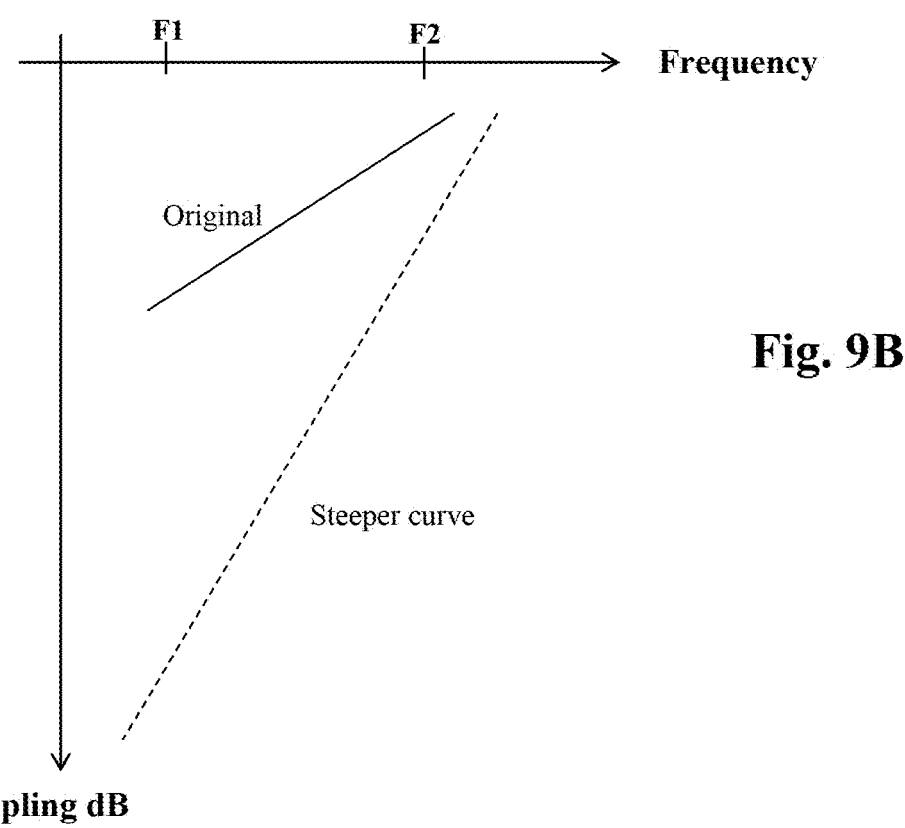

Since coupling depends on frequency, the coupling itself also provides a basic filtering effect between two frequencies. However, this filtering can be mild and may be improved by a steeper coupling curve (dashed line in FIG. 9B). A steeper curve improves filtering between two frequencies F1 and F2. Steeper curve means selective coupling factor, i.e. coupling depending on frequency. Such coupling dependence on frequency actually provides a filtering effect that enables an induced signal to the second line depending on the original signal frequency (on the bi-directional line). In this manner signals from the transmitter (being at a first frequency) could be filtered out and not effectively coupled to the one directional line, whereas signals from the antenna (being at a second frequency) could be induced to the one directional line and propagate to the receiver.

Figure 10:
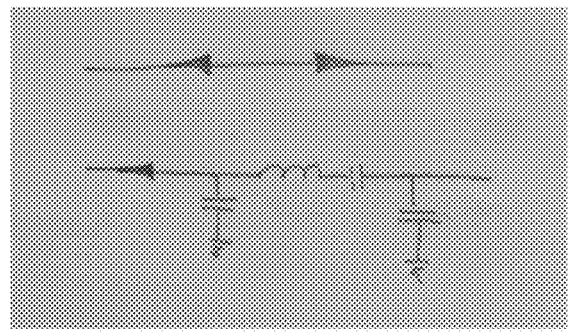
FIG. 10 illustrates an embodiment of the present invention with additional passive components.

The present invention relates to incorporation of additional passive components (e.g. capacitors, inductors and resistors) into the one-directional line 11 thus enhancing the steepness of the coupling curve. FIG. 10 shows an example of managing curve steepness with additional passive components. These additional passive components effectively convert the one-directional line 11 to a resonant structure. Examples of actual components to be inserted—MLCC capacitor preferably of 1-20 pF, MLCC inductors preferably of 0.5 to 22 nH.

Figure 11:
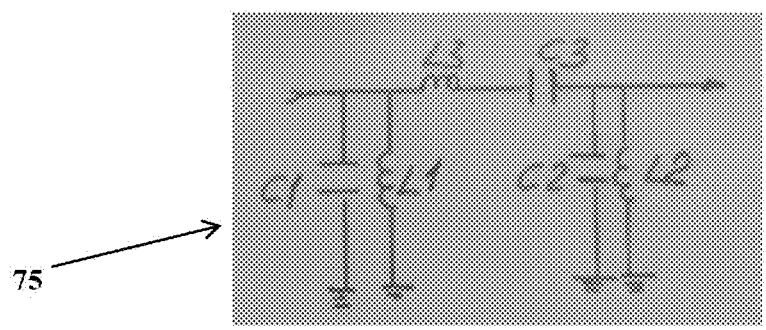
FIG. 11 illustrates an embodiment of the present invention with a discrete resonant filter.

It is also possible to insert discrete resonant filters into the one directional line 11. FIG. 11 shows a general example of such filter 75. The filter has a low insertion loss. Insertion loss is a parameter describing energy losses in the filter itself. The present invention aims to use such components with the lowest energy losses, i.e. with the (lowest Insertion Loss).

Figure 12:
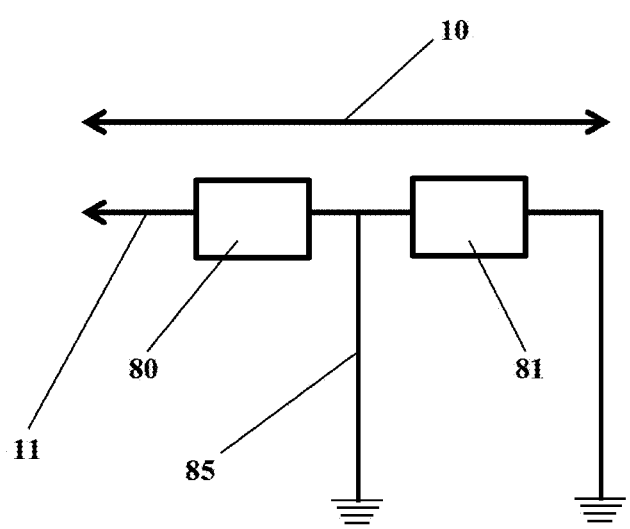
FIG. 12 illustrates an embodiment of the present invention with two connected resonant structures.

The resonance effect may be increased by combining several resonant structures. Resonance effect in a one directional line can be increased by forming the line as several independent resonant structures connected to each other. FIG. 12 shows an example of a one-directional line 11 with two connected resonant structures 80 and 81. The figure shows a line 85 connecting between ground and the line connecting the two resonant structures 80 and 81. These resonance structures actually work as filters inserted into the line. This design is preferable compared to the discrete filters in the line. Major advantages of such a structure are smaller size and lower energy losses compared to use with discrete filters.

Additional Lines Preferred Embodiment

According to another preferred embodiment of the present invention, additional transmission lines (or portions thereof) are set in proximity to the one directional line (or to a portion thereof) such that electromagnetic coupling occurs and an induced signal is coupled from line to the additional lines. The additional lines are structured such that they act as a filter enabling signal propagation on line 11 to the receiver (Rx) and prevent signal propagation on line 11 in the opposite direction. The additional lines surround the second line 11 (or a first additional line is in proximity to line 11 and the second additional line is in proximity to the first additional line, the third in proximity to the second, etc.) and cause resonance at certain frequencies. Due to this resonance, there is a filtering effect at this frequency.

The dimensions, proximity distance, etc. between line 11 and the first additional line only can affect the resonance along frequency axis. However, one additional line usually causes shallow resonance. In order to increase this effect, additional lines are added.

This embodiment is based on a combination of the additional transmission lines. A portion of a first additional transmission line is placed in proximity to a portion of one directional line 11. A portion of a second additional transmission line is placed in proximity to a portion of the first additional transmission line. A portion of a third additional transmission line is placed in proximity to a portion of the second additional transmission line, etc. The first additional transmission line (the one closest to line 11) is referred to as the edged spaced apart portion.

The additional transmission lines are connected to loads at their edges (loads may be ground) or may be opened (not connected to a load) typically at one of their ends. The properties of the additional transmission lines are such that each transmission line has some inductance per length unit and some resistance per length unit and two adjacent lines have some capacitance (between them) on a length unit. Thus combining several lines of certain properties at certain distances between them, can provide an efficient element with certain capacitance, inductance and resistance. Such a complex structure works as a filter at certain frequencies. The present invention is such that an original signal with a first frequency, sent from the transmitter to the antenna causes an induced signal at a certain frequency on the one directional line. The additional transmission lines (receive coupled/induced signals and) prevent propagation of the signal to the direction opposite of the receiver and thus actually act as a filter (at that given frequency derived from the original frequency sent from the transmitter). On the other hand the signal from the antenna is at a different (second) frequency and thus is induced to the one directional line allowing signal propagation to the receiver. The frequency of the signal on the one directional line propagating to the receiver is derived from the original second frequency sent from the antenna and is not filtered by the additional lines. The calculation of the topology and design (width, thickness, proximity separation distance, etc.) of the additional transmission lines, for filtering a certain frequency band and allowing propagation of another frequency band, can be applied by available software, optionally according to the desired frequency usage input (i.e. frequency of the received signal from the antenna and the frequency of the signal from the transmitter to be transmitted). Thus a resonance effect in the net of secondary lines (at targeted frequencies) is achieved by combination of their geometry and spacing between them.

According to one embodiment, the additional transmission lines may not necessarily be parallel to each other or to line 11. Electromagnetic induction may occur at a certain level (according to the line dimensions, materials, separation length, etc.) and at a certain frequency band, even if the portions of the lines are positioned at a certain angle from one another or from line 11. According to one embodiment the bi-directional line is surrounded by and electromagnetically coupled to a net of resonant lines electromagnetically coupled to each other.

The present invention structure is such that the bi-directional line is in proximity and electromagnetically coupled to the one directional line which is in proximity and electromagnetically coupled to the net (additional lines) of resonant lines coupled to each other.

The duplexer comprises a plurality of additional transmission lines, wherein a portion of each of said additional transmission lines is spaced apart from one another (substantially on the same plane) such that each two adjacent spaced apart portions are (preferably substantially parallel and) in proximity to one another. One of the spaced apart portions being at the edge side of the plurality of spaced apart portions (and being closest of the additional lines to line 11, referred to herein as the edged spaced apart portion) is (preferably substantially parallel and) in proximity to a portion of the one directional transmission line 11. The spaced apart portions are such that enable occurrence of electromagnetic induction of RF signals between two of the portions (typically between two adjacent portions). The edged portion (preferably substantially parallel and) in proximity to line 11 is such that enables occurrence of electromagnetic induction of RF signals between the edged portion and line 11.

Optionally, more than one of the coupling portions of the additional transmission lines is placed in proximity to line 11 (and substantially parallel to it) in a manner such that they are not necessarily on the same plane. Optionally, the coupling portions could be at various distances from one another and from line 11. It should be understood that the various distances could also be various distances in more than one axis. Optionally, two or more of the additional transmission lines coupling portions are equally distanced from line 11 (e.g. being on the same circle with line 11 being in the center of the circle). The portions of each of the additional transmission lines is such that enables occurrence of electromagnetic induction of RF signals between two or more of the additional transmission lines or between one or more of the additional transmission lines with the second transmission line. The electromagnetic induction causes a restriction (or substantial reduction) of signal propagation on line 11 in the direction from the third duplexer port 5*c*.

Figure 13:
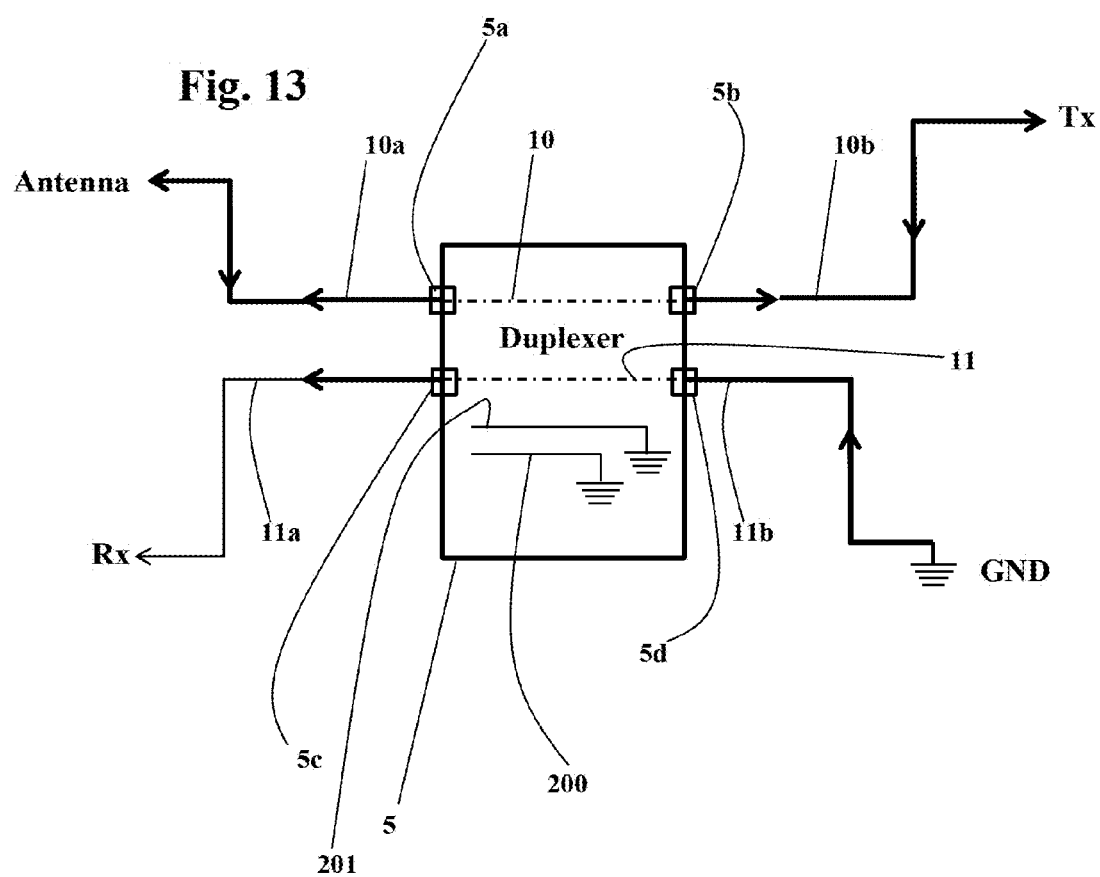
FIG. 13 illustrates an embodiment of the present invention with additional transmission lines.

FIG. 13 shows an example of the present invention duplexer 5 main structure (as explained in FIG. 3B) along with two additional "filtering" transmission lines 200 and 201 (working as a filter). The left ends of lines 200 and 201 are open (i.e. not connected to any port) and their right ends are grounded. When the antenna sends the received signal (via line 10*a* and 10 thereafter) the signal is coupled to line 11 in the opposite direction (leftwards in FIG. 13). Then the coupled signal propagates to the receiver. The induced signal frequency on line 11 does not enable substantial induction onto line 200. When the transmitter sends a signal to be transmitted (via line 10*b* and 10 thereafter) the signal is coupled to line 11 in the opposite direction (rightwards in FIG. 13). Then the coupled signal is coupled to line 200 (leftwards) and then the coupled signal on line 200 is induced to line 201 (rightwards). This plurality of additional coupling causes suppression of the signal on line 11, and thus restriction of propagation on line 11.

According to this example, the distance between line 10 and line 11 is in the range of 22-34 microns. Line 11 must be above or below line 10. Lines 10 and 11 are parallel. The distance between line 11 and 200 is in the range of 24-42 microns. Line 200 must be below or above line 11. The distance between lines 200 and 201 must be in the range of 28-36 microns. Line 201 must be below or above line 200. Line 10 has 2.5-3.2 mm in length, 85 microns in width and has a 25 micron thickness. Line 11 is 2.5-3.2 mm in length, 76 microns in width and has a 25 microns thickness. Line 200 is 1.9-2.3 mm in length, 76 microns in width and has a 25 microns thickness. Line 201 is 1.7-1.8 mm in length, 76 microns in width and has a 25 microns thickness. Depending on the exact aforementioned dimension ranges of the lines structure, resonance in line 11 (i.e. restriction of signal propagation) is achieved in region of 2.08-2.34 GHz.

Figure 14:
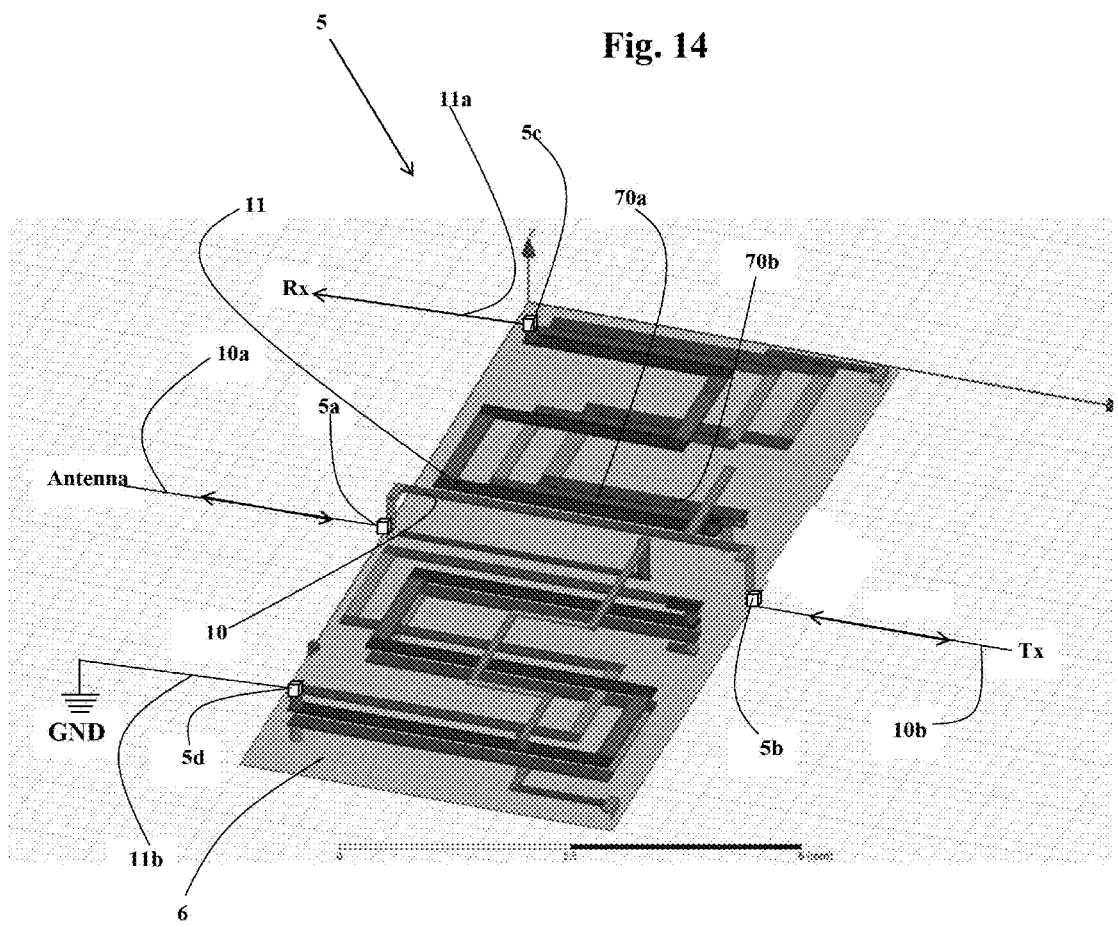
FIG. 14 illustrates an embodiment of the present invention with additional transmission lines.

FIG. 14 shows an example of a duplexer in small physical size according to this embodiment. Duplexer 5 comprises a base element being dielectric substrate 6, preferably with permittivity of 4-8. The bi-directional line 10 is shown across the width of the duplexer 5 and connected at one end to duplexer first port 5*a* and at the other end to duplexer second port 5*b*. The one-directional line 11 is connected at one end to duplexer third port 5*c* and at the other end to duplexer fourth port 5*d*.

Duplexer first port 5*a* is coupled to the antenna via transmission line 10*a*, second port 5*b* is coupled to the transmitter (Tx) via transmission line 10*b*, third port 5*c* is coupled to the receiver (Rx) via transmission line 11*a* and fourth port 5*d* is coupled to the ground via transmission line 11*b*. Portions of the additional transmission lines 70*a* and 70*b* are shown in proximity to a portion of one-directional line 11.

Portions of the additional transmission lines may be positioned for coupling between each other (and line 11) at more than one locations. There are portions of the additional lines parallel to line 11 at more than one location, as shown in the snaking configuration of FIG. 14. This contributes to the coupling causing the filtering effect.

The present invention also relates to a method for transmitting and receiving electromagnetic signals as explained hereinabove in connection with the device. In the method, the receiving is achieved by:
   A) passing a received electromagnetic signal from an antenna to a duplexer;
   B) passing the received signal within said duplexer via a first transmission line;
   C) electromagnetically coupling the received signal on the first transmission line to a second transmission line;
   D) passing the received signal on the second transmission line to a receiver;
And wherein the transmitting is achieved by:
   A) passing the signal to be transmitted from a transmitter to said duplexer;
   B) passing the signal to be transmitted within said duplexer via said first transmission line;
   C) provided that the signal to be transmitted is electromagnetically coupled from said first transmission line to said second transmission line, restricting propagation of the coupled signal on the second transmission line;
   D) passing the signal to be transmitted on said first transmission line to the antenna for transmission.

The aforementioned restricting propagation of the coupled signal in step C of the transmitting is executed according to one of the following manners:
   A) cutting off the signal flow on the second transmission line by means of a switch of a signal direction power detector responsive to the signal propagation direction of the signal propagating in said second transmission line (as explained hereinabove regarding the switch embodiment, cutting off the signal is carried out when the coupled signal propagates towards the receiver);
   B) providing the second transmission line comprises a reflecting load, suppressing the coupled signal by a reflecting signal caused by said reflecting load such that the coupled signal and the reflecting signal substantially cancel each other;
   C) providing the second transmission line comprises a filter, suppressing the coupled signal by means of a filter;
   D) suppressing the coupled signal by coupling the coupled signal to one or more additional transmission lines;
   E) providing a plurality of additional transmission lines, suppressing the coupled signal by coupling the coupled signal to a first of said additional transmission lines, and from the first to the second, second to third etc., in other words—optionally repeating the step of coupling the signal from an additional transmission line to a subsequent additional transmission line, wherein in said optionally repeated step the signal is coupled to an additional transmission line which has not been previously used, i.e. did not yet have a signal propagating on it.

The present invention also relates to a method for transmitting and receiving electromagnetic signals,
wherein the receiving is achieved by:
   A) passing a received electromagnetic signal from an antenna to a duplexer;
   B) passing the received signal within said duplexer via a first transmission line;
   C) electromagnetically coupling the received signal on the first transmission line to a second transmission line;
   D) providing the second transmission line comprises a high directivity coupler, electromagnetically coupling the coupled signal on the second transmission line to a third transmission line comprised in said high directivity coupler;
   E) passing the received signal on said third transmission line to a receiver;
And wherein the transmitting is achieved by:
   A) passing the signal to be transmitted from a transmitter to said duplexer;
   B) passing the signal to be transmitted within said duplexer via said first transmission line;
   C) passing the signal to be transmitted on said first transmission line to the antenna for transmission.

According to the embodiment with the high directivity coupler, during the transmitting procedure, the structure of the transmission lines is preferably built in a manner such that working signals to be transmitted (from the transmitter) are at frequencies such that the signal from the transmitter is not substantially coupled to second line and the coupled signal on the second line is not substantially coupled (if at all) to the third line.

The present invention also relates to a method for navigating RF signals through the duplexer as explained herein, wherein the duplexer is connected to other sources in a similar manner as connected to the antenna, receiver, transmitter, mutatis mutandis (e.g. instead of antenna, receiver and transmitter—first source, second source and third source, respectively). The present invention duplexer also can be connected/coupled to a first source, second source and third source (e.g. instead of antenna, receiver and transmitter, respectively mutatis mutandis.

The present invention relates to method for passing electromagnetic signals through a duplexer,
wherein passing from a first source (coming from line 10*b*) is achieved by:
   A) passing an electromagnetic signal from said first source (from line 10*a*) to a first duplexer port (5*a*);
   B) passing the signal from said first port (5*a*) within said duplexer via a first transmission line (10);
   C) electromagnetically coupling the received signal on the first transmission line (10) to a second transmission line (11);
   D) passing the signal on the second transmission line (11) to a third duplexer port (5*c*) and therefrom to a second source (via line 11*a*);
and wherein passing from a third source is achieved by:
   A) passing a signal from said third source (on line 10*b*) to a second duplexer port (5*b*);
   B) passing the signal from said second duplexer port (5*b*) within said duplexer via said first transmission line (10);
   C) provided that the signal on said first transmission (10) line is electromagnetically coupled from said first transmission line (10) to said second transmission line (11), restricting propagation of the coupled signal on the second transmission line (11);

D) passing the signal from said first transmission line (10) to said first duplexer port (5*a*) and therefrom to said first source (via line 10*a*).

It is noted that in connection with this particular method embodiment the first, second and third ports relate to 5*a*, 5*b* and 5*c* respectively.

Preferably, restricting propagation of the coupled signal in step C of the passing from a first source, is executed according to one of the following manners:

A) cutting off the signal flow on the second transmission line by means of a switch of a signal direction power detector responsive to the signal propagation direction of the signal propagating in said second transmission line;

B) providing the second transmission line comprises a reflecting load, suppressing the coupled signal by a reflecting signal caused by said reflecting load such that the coupled signal and the reflecting signal substantially cancel each other;

C) providing the second transmission line comprises a filter, suppressing the coupled signal by means of a filter;

D) suppressing the coupled signal by coupling the coupled signal to one or more additional transmission lines;

E) providing a plurality of additional transmission lines, suppressing the coupled signal by coupling the coupled signal to a first of said additional transmission lines and optionally repeating the step of coupling the signal from an additional transmission line to a subsequent additional transmission line, wherein in said optionally repeated step the signal is coupled to an additional transmission line which has not been previously used.

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A duplexing system comprising:
a duplexer;
an antenna configured to transmit and receive electromagnetic signals;
a transmitter configured to couple electromagnetic signals to said antenna for transmission;
a receiver configured to receive electromagnetic signals;
wherein the duplexer comprises a first transmission line and a second transmission line, wherein a portion of said first transmission line is placed in proximity to a portion of said second transmission line such that an electromagnetic coupling is caused between said first transmission line and said second transmission line;
wherein a first end of said first transmission line is connected to a first duplexer port coupled to said antenna and a second end of said first transmission line is connected to a second duplexer port coupled to said transmitter; and
wherein a first end of said second transmission line is connected to a third duplexer port coupled to said receiver and a second end of said second transmission line is directly coupled to ground or connected to a fourth duplexer port coupled to ground.

2. The duplexing system according to claim 1, wherein the portion of the first transmission line is placed in proximity to the portion of the second transmission line such that the proximity enables occurrence of electromagnetic induction of radio frequency (RF) signals between the first transmission line and the second transmission line.

3. The duplexing system according to claim 2, wherein the first transmission line enables electromagnetic signal propagation in two directions and the second transmission line enables electromagnetic signal propagation in one direction, wherein said one direction is a direction to the third duplexer port.

4. The duplexing system according to claim 1, wherein the portion of the first transmission line and the portion of the second transmission line are spaced apart from one another substantially on the same plane and are substantially parallel and in proximity to one another.

5. The duplexing system according to claim 1, wherein the second transmission line comprises a signal direction power detector configured to detect an electromagnetic signal propagation direction of an electromagnetic signal propagating in said second transmission line, wherein said signal direction power detector enables electromagnetic signal propagation in a direction to the third duplexer port and restricts electromagnetic signal propagation in a direction from the third duplexer port.

6. The duplexing system according to claim 5, wherein the signal direction power detector comprises a switch, wherein when the electromagnetic signal propagation on the second transmission line is in the direction from the third duplexer port, the switch is configured to cut off the electromagnetic signal propagation on said second transmission line, and wherein when the electromagnetic signal propagation on the second transmission line is in the direction to the third duplexer port, the switch is configured to enable the electromagnetic signal propagation on said second transmission line.

7. The duplexing system according to claim 1, wherein the second transmission line comprises a reflecting load, wherein said reflecting load enables electromagnetic signal propagation in a direction to the third duplexer port and restricts electromagnetic signal propagation in a direction from the third duplexer port.

8. The duplexing system according to claim 1, wherein the second transmission line further comprises a filter.

9. The duplexing system according to claim 1, wherein the duplexer further comprises a plurality of additional transmission lines coupled to loads at each end, or opened at one end, wherein a portion of each of said plurality of additional transmission lines is spaced apart from one another substantially on the same plane such that each two adjacent spaced apart portions are substantially parallel and in proximity to one another.

10. The duplexing system according to claim 9, wherein the two adjacent spaced apart portions of each of said plurality of additional transmission lines is spaced apart from one another, wherein the spacing enables occurrence of electromagnetic induction of radio frequency (RF) signals between each of said plurality of additional transmission lines; and wherein one of the plurality of additional transmission lines is closest to the second transmission line, wherein the spacing enables occurrence of electromagnetic induction of RF signals between an additional transmission line closest to the second transmission line and the second transmission line.

11. The duplexing system according to claim 10, wherein the electromagnetic induction occurring on the plurality of additional transmission lines cause a reduction or a restriction of an electromagnetic signal propagation in a direction from the third duplexer port.

12. The duplexing system according to claim 1, wherein the duplexer further comprises a plurality of additional transmission lines coupled to loads at each end, or opened at one end, wherein a portion of each of said plurality of additional transmission lines and a portion of the second transmission line are spaced apart from one another substantially on the same plane and are substantially parallel and in proximity to one another.

13. The duplexing system according to claim 12, wherein the portion of each of the plurality of additional transmission lines and the portion of the second transmission line are spaced apart from one another substantially on the same plane and are substantially parallel and in proximity to one another, wherein the proximity enables occurrence of electromagnetic induction of radio frequency (RF) signals between at least two of said plurality of additional transmission lines, or enables occurrence of electromagnetic induction of RF signals between at least one of said portion of each of the plurality of additional transmission lines and the second transmission line; wherein said electromagnetic induction causes a reduction or a restriction of electromagnetic signal propagation in a direction from the third duplexer port.

14. A duplexing system comprising:
a duplexer;
an antenna configured to transmit and receive electromagnetic signals;
a transmitter configured to couple electromagnetic signals to said antenna for transmission;
a receiver configured to receive electromagnetic signals;
wherein the duplexer comprises a first transmission line and a second transmission line, wherein a portion of said first transmission line is placed in a first proximity to a portion of said second transmission line, the first proximity causing electromagnetic coupling between said first transmission line and said second transmission line;
wherein a first end of said first transmission line is connected to a first duplexer port coupled to said antenna and a second end of said first transmission line is connected to a second duplexer port coupled to said transmitter; and
wherein both ends of said second transmission line are connected to loads;
wherein said second transmission line comprises a high directivity coupler comprising an interior transmission line connected at a first end to a third duplexer port coupled to the receiver and at a second end to ground;
wherein a portion of said interior transmission line is in a second proximity to a portion of said second transmission line, the second proximity causing electromagnetic coupling between said second transmission line and said interior transmission line.

15. A method for receiving and transmitting electromagnetic signals, wherein the receiving comprises:
passing a received electromagnetic signal from an antenna to a duplexer;
passing the received electromagnetic signal within said duplexer via a first transmission line;
electromagnetically coupling the received electromagnetic signal on the first transmission line to a second transmission line; and
passing the received electromagnetic signal on the second transmission line to a receiver;

and wherein the transmitting comprises:
passing a generated electromagnetic signal to be transmitted from a transmitter to said duplexer;
passing the generated electromagnetic signal to be transmitted within said duplexer via said first transmission line;
provided that the generated electromagnetic signal to be transmitted is electromagnetically coupled from said first transmission line to said second transmission line, restricting propagation of the coupled electromagnetic signal on the second transmission line; and
passing the generated electromagnetic signal to be transmitted on said first transmission line to the antenna for transmission.

16. The method according to claim 15, wherein the restricting propagation of the coupled electromagnetic signal of the transmitting is executed according to one of the following:
A) cutting off an electromagnetic signal propagation on the second transmission line by means of a switch of a signal direction power detector configured to detect an electromagnetic signal propagation direction of the electromagnetic signal propagating in said second transmission line;
B) wherein the second transmission line comprises a reflecting load, suppressing the coupled electromagnetic signal by a reflecting electromagnetic signal caused by said reflecting load such that the coupled electromagnetic signal and the reflecting electromagnetic signal substantially cancel each other;
C) wherein the second transmission line comprises a filter, suppressing the coupled electromagnetic signal by means of the filter;
D) suppressing the coupled electromagnetic signal by electromagnetically coupling the coupled signal to a plurality of additional transmission lines; and
E) wherein a plurality of additional transmission lines is configured to suppress the coupled electromagnetic signal by electromagnetically coupling the coupled electromagnetic signal to a first of said plurality of additional transmission lines and repeating the step of electromagnetically coupling the electromagnetic signal from the first of the plurality of additional transmission lines to a second of the plurality of additional transmission lines, wherein said repeating step couples the electromagnetic signal to an additional transmission line of the plurality of additional transmission lines which has not been previously used.

17. A method for transmitting and receiving electromagnetic signals, wherein the receiving comprises:
passing a received electromagnetic signal from an antenna to a duplexer;
passing the received electromagnetic signal within said duplexer via a first transmission line;
electromagnetically coupling the received electromagnetic signal on the first transmission line to a second transmission line;
providing the second transmission line comprises a high directivity coupler, electromagnetically coupling the coupled electromagnetic signal on the second transmission line to a third transmission line comprised in said high directivity coupler;
passing the received electromagnetic signal on said third transmission line to a receiver;
and wherein the transmitting comprises:
passing a generated electromagnetic signal to be transmitted from a transmitter to said duplexer;

passing the generated electromagnetic signal to be transmitted within said duplexer via said first transmission line;

passing the generated electromagnetic signal to be transmitted on said first transmission line to the antenna for transmission.

18. A duplexer comprising a first transmission line and a second transmission line, wherein a portion of said first transmission line is placed in proximity to a portion of said second transmission line such that an electromagnetic coupling is caused between said first transmission line and said second transmission line;
   wherein a first end of said first transmission line is connected to a first duplexer port and a second end of said first transmission line is connected to a second duplexer port; and
   wherein a first end of said second transmission line is connected to a third duplexer port, and a second end of said second transmission line is directly coupled to ground or connected to a fourth duplexer port.

19. The duplexer according to claim 18, wherein the portion of the first transmission line is placed in proximity to the portion of the second transmission line such that the proximity enables occurrence of electromagnetic induction of radio frequency (RF) signals between the first transmission line and the second transmission line.

20. The duplexer according to claim 18, wherein the portion of the first transmission line and the portion of the second transmission line are spaced apart from one another substantially on the same plane and are substantially parallel and in proximity to one another.

21. The duplexer according to claim 18, wherein the second transmission line comprises a signal direction power detector configured to detect an electromagnetic signal propagation direction of an electromagnetic signal propagating in said second transmission line, wherein said signal direction power detector enables electromagnetic signal propagation in a direction to the third duplexer port and restricts electromagnetic signal propagation in a direction from the third duplexer port.

22. The duplexer according to claim 21, wherein the signal direction power detector comprises a switch, wherein when the electromagnetic signal propagation on the second transmission line is in the direction from the third duplexer port, the switch is configured to cut off the electromagnetic signal propagation on said second transmission line, and wherein when the electromagnetic signal propagation on the second transmission line is in the direction to the third duplexer port, the switch is configured to enable the electromagnetic signal propagation on said second transmission line.

23. The duplexer according to claim 18, wherein the second transmission line comprises a reflecting load, wherein said reflecting load enables electromagnetic signal propagation in a direction to the third duplexer port and restricts electromagnetic signal propagation in a direction from the third duplexer port.

24. The duplexer according to claim 18, wherein the second transmission line further comprises a filter.

25. The duplexer according to claim 18, wherein the duplexer further comprises a plurality of additional transmission lines coupled to loads at each end, or opened at one end, wherein a portion of each of said plurality of additional transmission lines is spaced apart from one another substantially on the same plane such that each two adjacent spaced apart portions are substantially parallel and in proximity to one another.

26. The duplexer according to claim 25, wherein the two adjacent spaced apart portions of each of said plurality of additional transmission lines are spaced apart from one another, wherein the spacing enables occurrence of electromagnetic induction of radio frequency (RF) signals between each of said plurality of additional transmission lines; and
   wherein one of the plurality of additional transmission lines is closest to the second transmission line, wherein the spacing enables occurrence of electromagnetic induction of RF signals between an additional transmission line closest to the second transmission line and the second transmission line.

27. The duplexer according to claim 26, wherein the electromagnetic induction occurring on the plurality of additional transmission lines cause a reduction or a restriction of an electromagnetic signal propagation in a direction from the third duplexer port.

28. The duplexer according to claim 18, further comprising a plurality of additional transmission lines coupled to loads at each end, or opened at one end, wherein a portion of each of said plurality of additional transmission lines and a portion of the second transmission line are spaced apart from one another substantially on the same plane and are substantially parallel and in proximity to one another.

29. The duplexer according to claim 28, wherein the portion of each of the plurality of additional transmission lines and the portion of the second transmission line are spaced apart from one another substantially on the same plane and are substantially parallel and in proximity to one another, wherein the proximity enables occurrence of electromagnetic induction of radio frequency (RF) signals between at least two of said plurality of additional transmission lines, or enables occurrence of electromagnetic induction of RF signals between at least one of said portion of each of the plurality of additional transmission lines and the second transmission line; wherein said electromagnetic induction causes a reduction or a restriction of electromagnetic signal propagation in the direction from the third duplexer port.

30. A duplexer comprising:
   a first transmission line and a second transmission line, wherein a portion of said first transmission line is placed in a first proximity to a portion of said second transmission line, the first proximity causing electromagnetic coupling between said first transmission line and said second transmission line;
   wherein a first end of said first transmission line is connected to a first duplexer port and a second end of said first transmission line is connected to a second duplexer port; and
   wherein both ends of said second transmission line are connected to loads;
   wherein said second transmission line comprises a high directivity coupler comprising an interior transmission line connected at a first end to a third duplexer port and at a second end to ground;
   wherein a portion of said interior transmission line is in a second proximity to a portion of said second transmission line, the second proximity causing electromagnetic coupling between said second transmission line and said interior transmission line.

31. A method for passing electromagnetic signals through a duplexer, wherein passing from a first source comprises:
   passing an electromagnetic signal from said first source to a first duplexer port;
   passing the electromagnetic signal from said first duplexer port via a first transmission line;

electromagnetically coupling the electromagnetic signal on the first transmission line to a second transmission line; and passing the electromagnetic signal on the second transmission line to a third duplexer port and therefrom to a second source;

and wherein passing from a third source comprises:

passing a generated electromagnetic signal from said third source to a second duplexer port;

passing the generated electromagnetic signal from said second duplexer port via said first transmission line;

provided that the generated electromagnetic signal on said first transmission line is electromagnetically coupled from said first transmission line to said second transmission line, restricting propagation of the coupled electromagnetic signal on the second transmission line; and passing the generated electromagnetic signal from said first transmission line to said first duplexer port and therefrom to said first source.

32. The method according to claim 31, wherein the restricting propagation of the coupled electromagnetic signal of the passing from a third source, is executed according to one of the following:

A) cutting off an electromagnetic signal propagation on the second transmission line by means of a switch of a signal direction power detector configured to detect an electromagnetic signal propagation direction of the electromagnetic signal propagating in said second transmission line;

B) wherein the second transmission line comprises a reflecting load, suppressing the coupled electromagnetic signal by a reflecting electromagnetic signal caused by said reflecting load such that the coupled electromagnetic signal and the reflecting electromagnetic signal substantially cancel each other;

C) wherein the second transmission line comprises a filter, suppressing the coupled electromagnetic signal by means of the filter;

D) suppressing the coupled electromagnetic signal by electromagnetically coupling the coupled signal to a plurality of additional transmission lines;

E) wherein a plurality of additional transmission lines is configured to suppress the coupled electromagnetic signal by electromagnetically coupling the coupled electromagnetic signal to a first of said plurality of additional transmission lines and repeating the step of electromagnetically coupling the electromagnetic signal from the first of the plurality of additional transmission lines to a second of the plurality of additional transmission lines, wherein said repeating step couples the electromagnetic signal to an additional transmission line which has not been previously used.

* * * * *